A. LANDAU.
RESERVE DRY CELL.
APPLICATION FILED JUNE 18, 1918.
1,317,139. Patented Sept. 23, 1919.
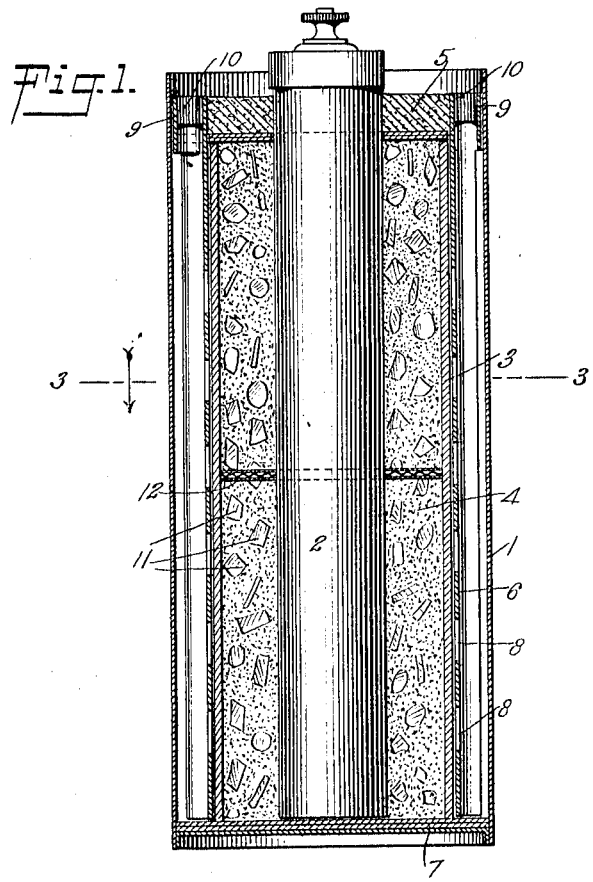
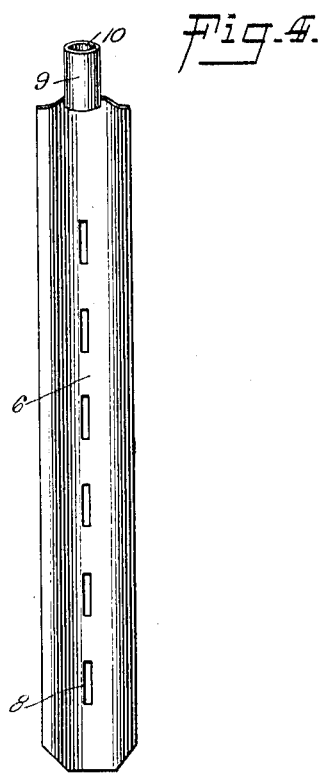
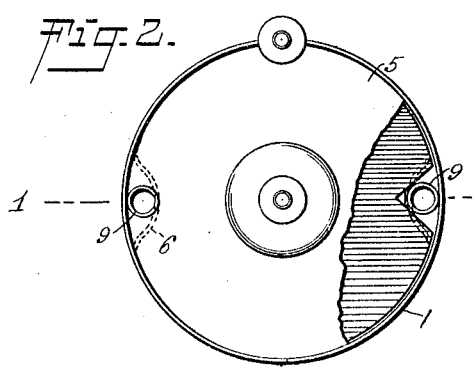
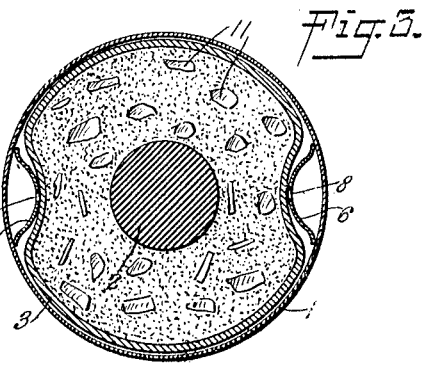
WITNESSES
William P. Goebel.
C. Bradway
INVENTOR
Alfred Landau
BY
ATTORNEYS

UNITED STATES PATENT OFFICE.

ALFRED LANDAU, OF NEW YORK, N. Y.

RESERVE DRY CELL.

1,317,139.  Specification of Letters Patent.  Patented Sept. 23, 1919.

Application filed June 18, 1918. Serial No. 240,666.

*To all whom it may concern:*

Be it known that I, ALFRED LANDAU, a subject of the King of Great Britain, and a resident of the city of New York, borough of Manhattan, in the county and State of New York, have invented a new and Improved Reserve Dry Cell, of which the following is a full, clear, and exact description.

This invention relates to a dry cell of that type that is manufactured and sold in a dry condition and the consumer supplies a charge of water thereto, whereby an electrolyte is formed which acts on the carbon and zinc to produce current when the cell is connected in an electric circuit.

Reserve cells of this type as heretofore constructed are provided with a hollow carbon electrode with apertures arranged at different levels, whereby the water can be supplied to the cell through this electrode and will distribute therefrom through the apertures to the mix to moisten the same and to act on the zinc cup or shell. A cell constructed in this manner is expensive to manufacture and is unsatisfactory, because quick and prompt action on the zinc electrode cannot be obtained nor thorough and uniform moistening of the mix nor the most efficient electrolytic action.

The object of the present invention is to overcome the objections inherent in reserve cells of the character referred to by so constructing the cell that the water is supplied to the cup at a point outside the bibulous lining, and the water percolates inwardly through the lining and mix to the central carbon electrode, which insures quicker and more uniform action on electrodes, and maximum efficiency is secured.

By adding the water directly to the bibulous lining the contact between the carbon electrode and the battery mix is not loosened, as is the case when water is poured into the cell through a hollow carbon electrode which tends to loosen the fine powder parts of the battery mix which rest around the carbon electrode.

To increase the quantity of water which the cell may absorb, the battery mix may contain small pieces of bibulous material which will absorb water to a greater extent than the battery mix and will act as a kind of reservoir to give out water to the battery mix as the battery becomes dry.

Another feature of the construction is that the cell when exhausted or nearly exhausted can be rejuvenated by pouring an electrolyte into the water-distributing channels which lie between the bibulous lining and the zinc cup, whereby the added electrolyte will act on the zinc to increase the life of the cell.

The battery to work successfully must show prompt depolarization, which process consists in combining the hydrogen which settles on the carbon electrode with the oxygen liberated through the chemical action of the manganese dioxid and the ammonium chlorid. If the carbon electrode is thoroughly wet, as in the case of that type where the water is charged through such electrode, there is too much hydrogen on the latter which will not combine in the right proportion with a small amount of liberated oxygen, and thus a surplus of hydrogen will be left at the carbon electrode which would retard complete, or nearly complete, depolarization. With the cell designed as herein disclosed this objection is entirely overcome.

For a more complete understanding of the invention reference is to be had to the following description and claims taken in connection with the accompanying drawing, which illustrates one embodiment of the invention and wherein similar characters of reference indicate corresponding parts in all the views.

Figure 1 is a central vertical section of the cell, the section being taken on the line 1—1, Fig. 2;

Fig. 2 is a plan view thereof with a portion of the seal broken away;

Fig. 3 is a horizontal section on the line 3—3, Fig. 1; and

Fig. 4 is a perspective view of one of the water distributing channels.

Referring to the drawing, 1 designates a zinc electrode in the form of a cup or shell, 2 a carbon electrode in the form of a solid rod, 3 the bibulous lining, 4 a chemical compound or mix, and 5 the seal. The foregoing are the elements of an ordnary cell, and the invention resides particularly in the means for supplying the water to the mix.

Located in the cell between the shell 1 and lining 3 is a water-distributing means in the form of one or more channels 6 formed of metal or equivalent material and shaped in the form of a trough with the hollow side presented to the internal surface of the shell or cup 1. Each channel is of such length as to extend from the seal 5 to the bottom 7 of the cell, and in each channel are apertures 8 spaced at different levels so that the water will be distributed more uniformly over the lining which bears against the convex side of the channel. The top of the channel is formed with a tubular inlet or neck 9 which passes through the sealing compound 5, and in this neck is normally placed a stopper 10. By removing the stopper water can be supplied to the cell and is distributed by the channel so as to uniformly pass through the bibulous lining and through the mix to the central electrode.

The mix may be provided with small pieces 11 of bibulous material which will absorb the water and hold the same so as to keep the mix moist for a longer time. If desired, one or more shelves 12 may be employed at different points in the mix so as to assist in conducting the water inwardly to the carbon electrode, but the use of shelves is not a necessary feature of the invention.

From the foregoing description taken in connection with the accompanying drawing, the advantages of the construction and method of operation will be readily understood by those skilled in the art to which the invention appertains, and while I have described the principle of operation, together with the article which I now consider to be the best embodiment thereof, I desire to have it understood that the article shown is merely illustrative and that such changes may be made when desired as fall within the scope of the appended claims.

Having thus described my invention, I claim as new and desire to secure by Letters Patent:

1. A dry cell including a cup, a bibulous lining therein, a mix in the lining, an electrode in the mix, in combination with a channel member inserted between the cup and bibulous lining and having apertures at different levels to supply fluid to the mix through the lining.

2. A dry cell comprising a cup, a bibulous lining therefor, a mix within the lining, an electrode in the mix, and a plurality of water distributing means extending vertically in the cup and lying between the cup and the bibulous lining.

3. A dry cell comprising a cup, a porous lining therefor, a mix within the lining, an electrode in the mix, a plurality of water distributing means extending vertically in the cup and lying between the same and the porous lining, said distributing means being open at the top of the cell, and means for closing the upper ends of the distributing means.

4. A dry cell comprising a cup, a porous lining therein, a mix in the lining, an electrode in the mix, a seal in the top of the cup, and means coöperating with the cup to form vertical channels outside the lining for supplying a porous liquid to and through the lining and to and through the mix.

ALFRED LANDAU.